FIG. 7 INFLUENCE OF AMOUNT OF SEED CRYSTAL ON THE CRYSTALLIZATION OF β-FORM OPTICALLY ACTIVE MATERIAL FROM α-FORM DL-GA.
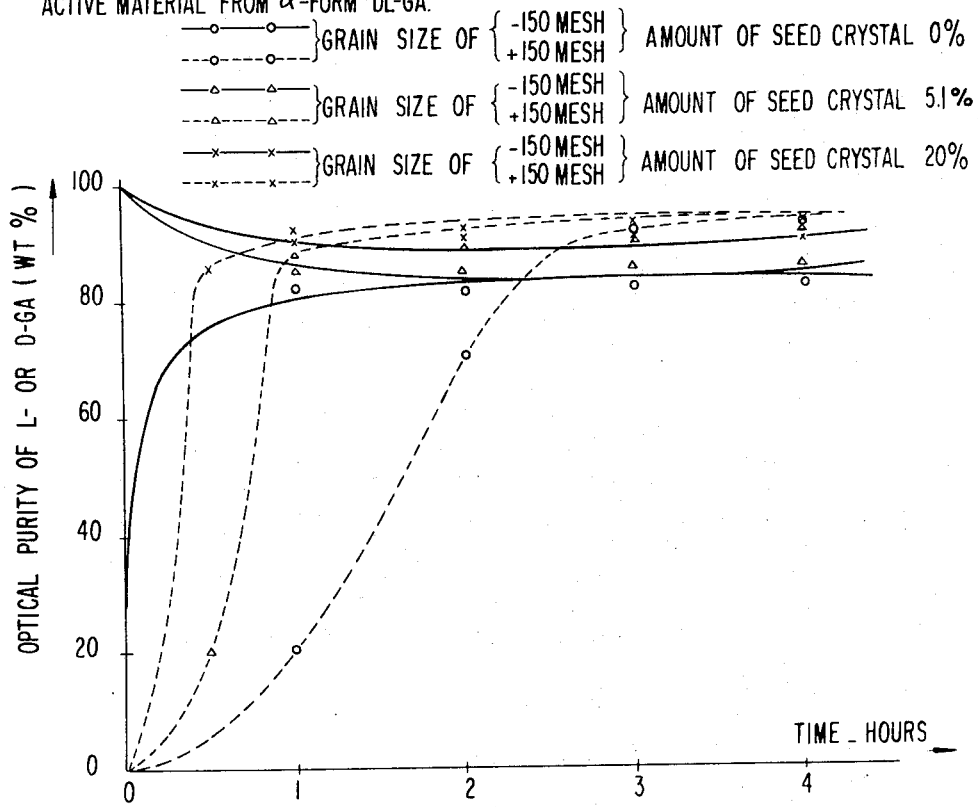
FIG. 8 INFLUENCE OF L-LEUCINE ON THE CRYSTALLIZATION OF β-FORM OPTICALLY ACTIVE MATERIAL FROM α-FORM DL-GA.
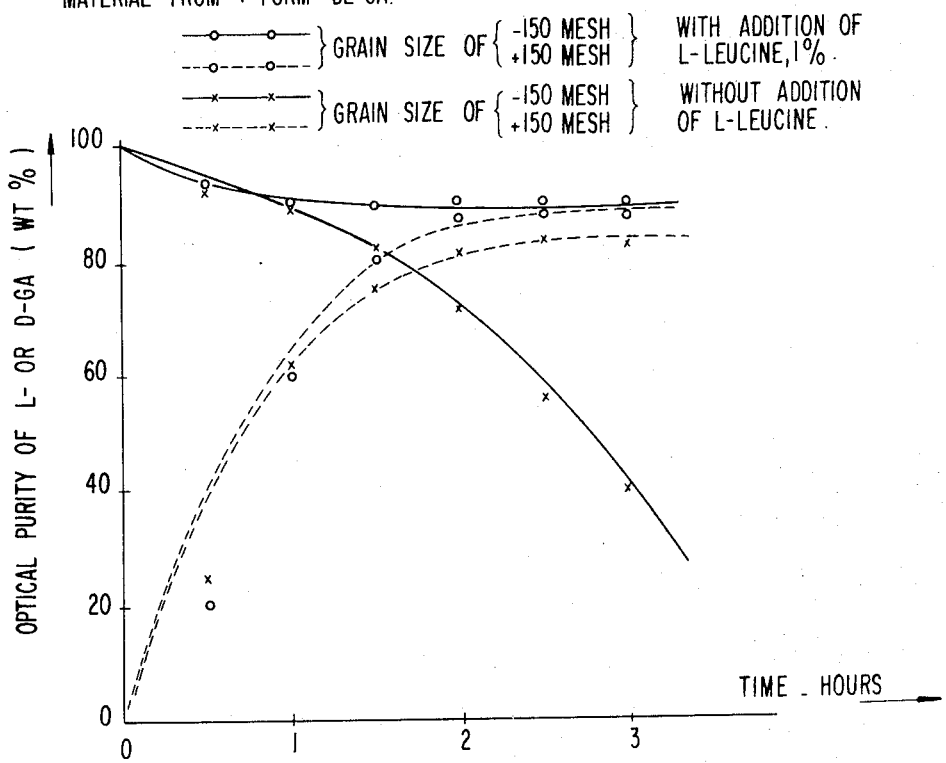

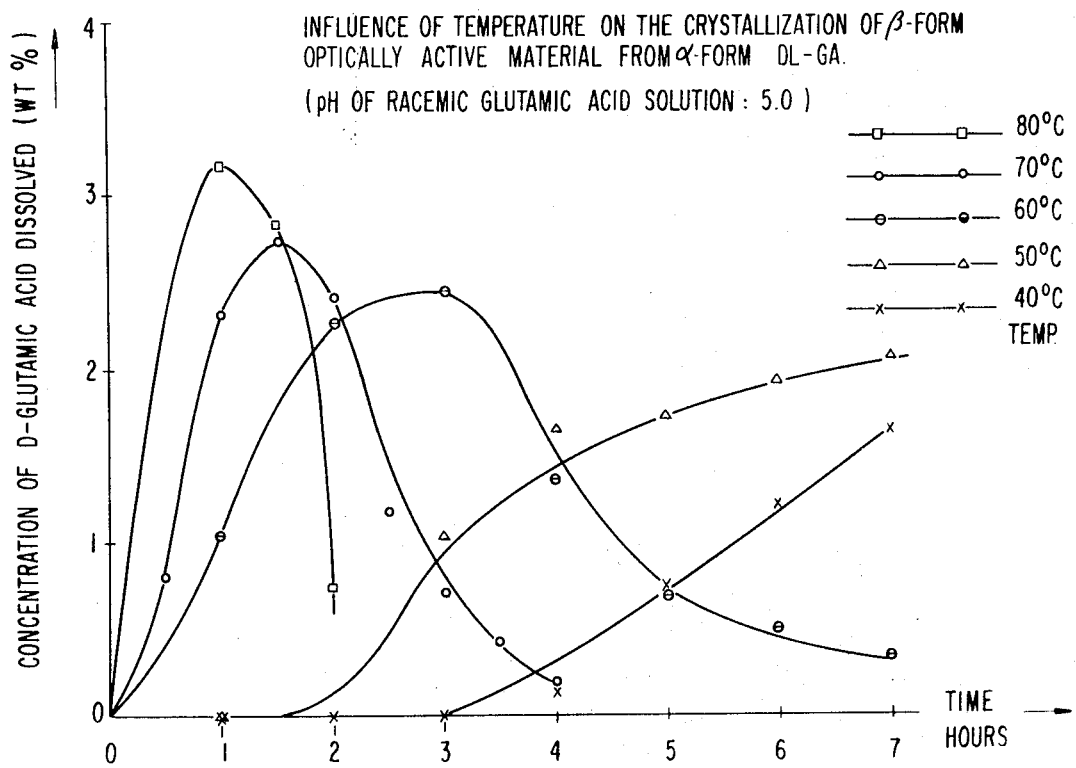
FIG.5
FIG.6
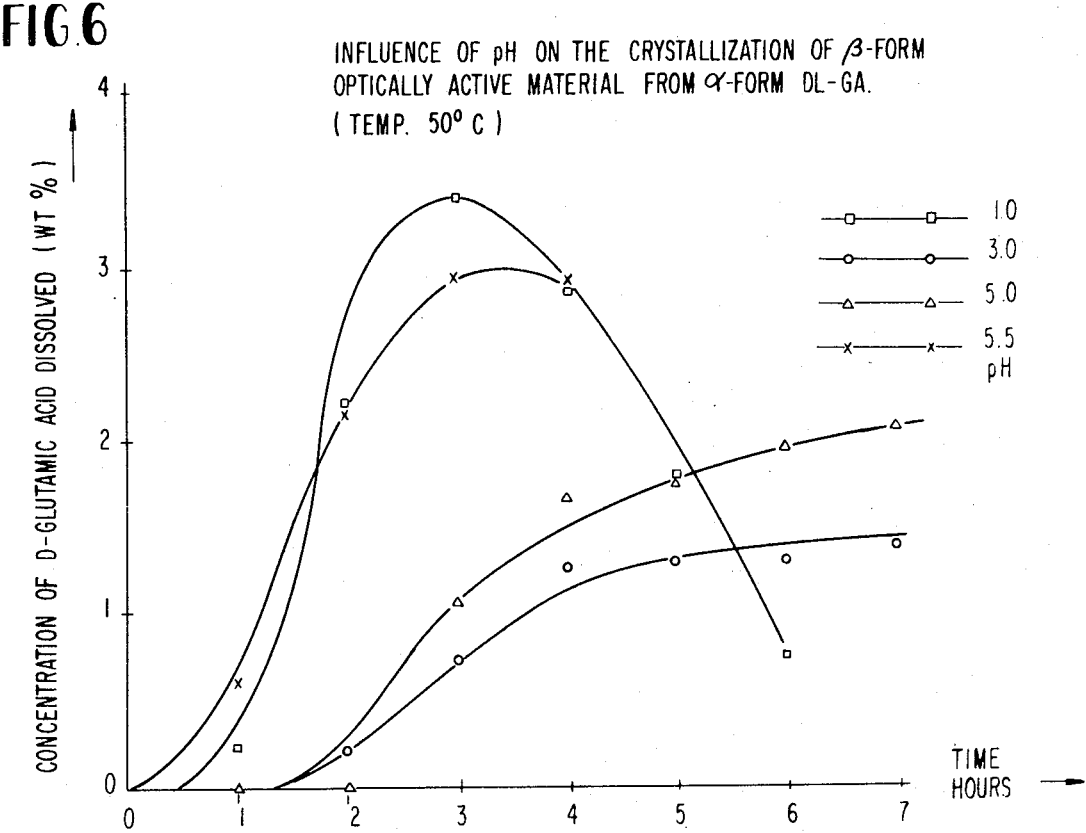

United States Patent Office 3,632,639
Patented Jan. 4, 1972

3,632,639
PROCESS FOR THE CRYSTALLIZATION OF OPTICALLY ACTIVE GLUTAMIC ACID
Yoshiitsu Tominaga, Takahisa Ogasawara, Hidemaro Tatemichi, and Hiroo Ito, Aichi, Japan, assignors to Toa Gosei Chemical Industry Co., Ltd., Tokyo, Japan
Filed Nov. 29, 1968, Ser. No. 779,928
Claims priority, application Japan, Nov. 29, 1967, 42/76,124; Jan. 26, 1968, 43/4,303; Mar. 19, 1968, 43/17,535; June 22, 1968, 43/42,901
Int. Cl. C07c 101/22
U.S. Cl. 260—534 G     23 Claims

ABSTRACT OF THE DISCLOSURE

Crystallizing β-form optically active glutamic acid from an aqueous racemic glutamic acid solution in which α-form racemic glutamic acid, which is a racemic mixture of α-form optically active glutamic acids, is present as the dispersed amount.

BACKGROUND OF THE INVENTION

Field of the invention

The present invention relates to a process for obtaining the crystals of β-form optically active glutamic acid from an aqueous racemic glutamic acid solution, and provides a valuable optical resolution method.

Description of the prior art

Two kinds of optically active glutamic acids are known: (1) a granular rhombic system α-form crystal (lattice constant: $a=7.06$ A., $b=10.3$ A., and $c=8.75$ A. [J. D. Bernal; "Z. Kryst."; 78, 363 (1931), hereinafter such a type of glutamic acid is called α-form D or L-GA]); and (2) a fine prismatic or flaky rhombic system β-form crystal (lattice constant: $2=5.17$ A., $b=17.34$ A., $c=6.95$ A. [S. Hirokawa; "Acta Cryst."; 8, 637 (1955); hereinafter such a type of glutamic acid is called β-form D or L-GA]). Optically inactive racemic glutamic acids are also known. There are three types of inactive glutamic acids: (1) a prismatic or flaky A-form crystal (T. Takenishi; "Nippon Kagaku Zasshi"; 82, 805 (1961), hereinafter such a type of glutamic acid is simply called A-form DL-GA; (2) a powdered amorphous B-form crystal (T. Akashi; "Nippon Kagaku Zasshi"; 83, 528 (1962), hereinafter, such a type of glutamic acid is simply called B-form DL-GA); and (3) an acicular or prismatic monohydrate (M. S. Dunn and M. P. Stoddard; "J. Biol. Chem."; 121, 521 (1937), hereinafter such a type of glutamic acid is simply called DL-GA-monohydrate).

Furthermore, it is known that there is a relation between racemic crystals and optically active crystals, i.e., that A-form DL-GA is a racemic mixture of β-form D-GA and β-form L-GA (cf.; T. Takenishi; "Nippon Kagaku Zasshi"; 82, 805 (1961)), and also that B-form DL-GA is the crystal of a racemic compound completely different from the α-form and β-form glutamic acids (cf.; T. Akashi; "Nippon Kagaku Zasshi"; 83, 528 (1962)).

However, there has heretofore not been known a process for crystallizing the crystals corresponding to a racemic mixture of α-form D-GA and α-form L-GA. In the course of investigations into a process for crystallizing the above crystals, the inventors have succeeded in the recovery of a new crystal form of racemic glutamic acid (hereinafter simply called α-form DL-GA) corresponding to a racemic mixture of α-form D-GA and α-form L-GA.

Accordingly, the present invention offers a novel process for the crystallization of optically active glutamic acid wherein a seed crystal is utilized.

SUMMARY OF THE INVENTION

The present invention comprises a process for crystallizing optically active glutamic acid. The process basically comprises contacting β-form optically active glutamic acid and seed crystals in an aqueous solution of racemic glutamic acid containing α-form racemic glutamic acid as the dispersed amount and crystallizing from the aqueous solution β-form optically active glutamic acid having the same optical activity as that of the seed crystal. By this process, one of the enantiomorphs of α-form racemic glutamic acid, which is in the form of conglomerate crystals, is recrystallized as β-form optically active glutamic acid which is in the form of fine prismatic or flaky crystals. A second enantiomorph (α-form optically active glutamic acid) is present in the form of conglomerate granular crystals. Accordingly, the original α-form racemic glutamic acid can easily be resolved into optically active glutamic acid by the difference in their crystal forms of specific gravity.

Preferred process conditions, and various embodiments of the above basic process, are given in the specification under the section dealing with the "Detailed Description of the Invention."

It is an object of the present invention to provide a process for crystallizing β-form optically active glutamic acid which provides a valuable optical or racemic resolution method.

A separate object of the present invention is to provide a process for crystallizing β-form optically active glutamic acid from an aqueous racemic glutamic acid solution in which α-form DL-GA is present as a dispersed amount, crystallization proceeding at a rate several times faster than conventional innoculation-type optical resolution methods.

BRIEF DESCRIPTION OF THE DRAWINGS

FIG. 5 is a plot illustrating the influence of temperature on the crystallization of β-form optically active material from α-form DL-GA.

FIG. 6 is a plot which illustrates the influence of the pH of a system on the crystallization of β-form optically active material from α-form DL-GA.

FIG. 7 is a plot which illustrates the effect of the amount of seed crystal which is utilized on the crystallization of β-form optically active material from α-form DL-GA.

FIG. 8 is a plot which illustrates the influence of leucine on the crystallization of β-form optically active material from α-form DL-GA.

DETAILED DESCRIPTION OF THE INVENTION

As heretofore indicated, the present invention provides a process for crystallizing β-form optically active glutamic acid from an aqueous racemic glutamic acid solution in which α-form racemic glutamic acid, which is a racemic mixture of α-form optically active glutamic acids, is present as the dispersed amount.

By the process of the present invention, one of the enantiomorphs of α-form racemic glutamic acid, which is in the form of conglomerate crystals, is recrystallized as β-form optically active glutamic acid which is in the form of fine prismatic or flaky crystals. On the other hand, a second enantiomorph (α-form optically active glutamic acid) is present in the form of conglomerate granular crystals. Accordingly, the original α-form racemic glutamic acid can be easily resolved into optically active glutamic acids by the difference in their crystalline forms or specific gravities.

The invention will now be explained in greater detail, particularly with reference to the accompanying drawings.

Figure 1:
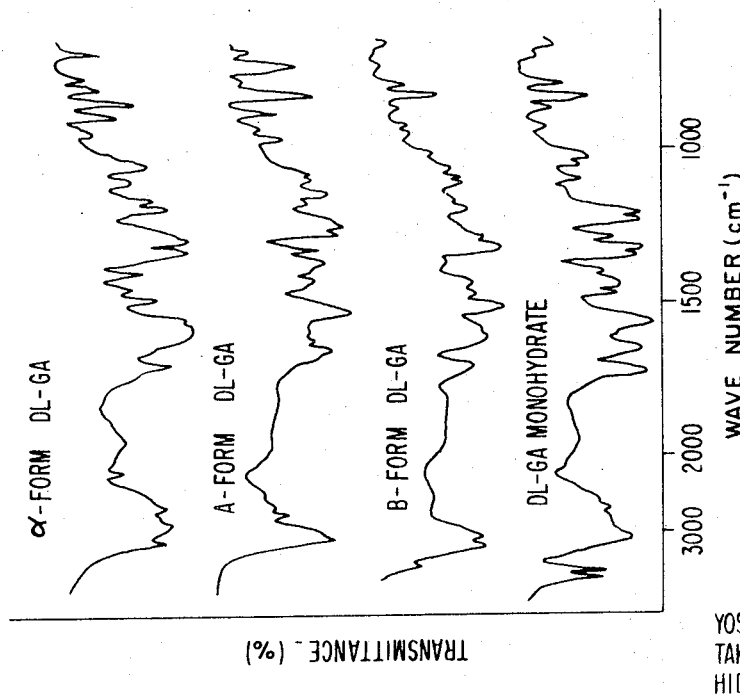
FIG. 1 is a plot which illustrates the infrared absorption spectra of α-form DL-GA, A-form DL-GA, B-form DL-GA, and DL-GA monohydrate plotted versus percent transmittance.

FIG. 1 is a graph showing the infrared absorption spectra of α-form DL-GA, A-form DL-GA, B-form DL-GA, and DL-GA monohydrate plotted versus percent transmittance.

Figure 2:
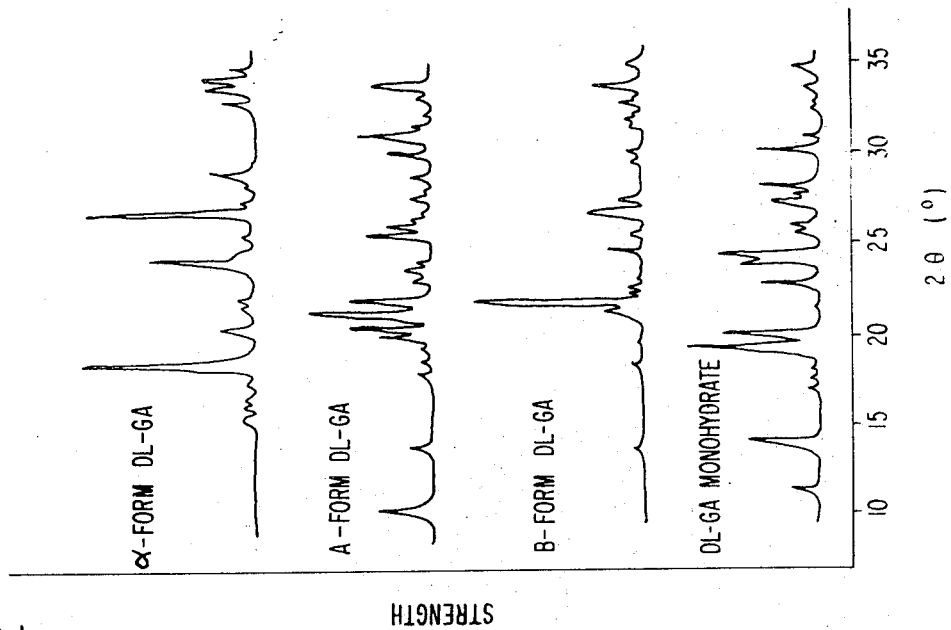
FIG. 2 is a plot which illustrates the X-ray diffraction patterns of α-form DL-GA, A-form DL-GA, B-form DL-GA, and DL-GA monohydrate.

FIG. 2 is a graph showing the X-ray diffraction patterns of α-form DL-GA, A-form DL-GA, B-form DL-GA, and DL-GA monohydrate.

The new crystal form of racemic glutamic acid is in a conglomerate form, and as clearly shown in FIGS. 1 and 2, the infrared absorption spectrum as well as the X-ray diffraction pattern of this new form are both different from those of the known crystal-form racemic glutamic acids. The infrared absorption spectrum and the X-ray diffraction pattern of the conglomerate-like crystal coincide with those of α-form D-GA or α-form L-GA, which have been reported in the heretofore cited papers and, therefore, the conglomerate crystal of the racemic glutamic acid has been determined by the inventors to be a racemic mixture of α-form D-GA or α-form L-GA.

The α-form DL-GA crystal illustrates a high growth rate, a very good sedimentation property and good filterability. Therefore, the α-form DL-GA crystals have the advantage that they can be separated easily from a mother liquor. Moreover, since the specific volume of the bulk density of the dried crystal is small, the crystal can be very easily stored or transported.

In the present invention, the aforesaid properties of the α-form DL-GA are utilized, and the objects and the merits of the present invention will be further explained below.

An object of the present invention is to provide a process for crystallizing β-form optically active glutamic acid, which provides a valuable optical or racemic resolution method.

More specifically, an object of this invention is to provide a process for crystallizing β-form optically active glutamic acid from an aqueous racemic glutamic acid solution in which α-form DL-GA is present as a dispersed amount at a rate of crystallization several times faster than that of conventional inoculation-type optical resolution methods wherein a dispersed amount, DL-GA monohydrate is inoculated with the crystals of optically active glutamic acid and α-form DL-GA is crystallized.

These and other objects of the invention will become clear from the following additional detailed description.

According to the process of this invention, a seed crystal of β-form optically active glutamic acid is added to an aqueous racemic glutamic acid solution containing α-form DL-GA as a dispersed amount (a crystal present as a solid phase in a saturated aqueous solution), whereby β-form optically active glutamic acid having the same optical activity as the seed crystal is recovered from the aqueous solution. The process of the invention is believed to result as a consequence of the crystallizing mechanism described in the following paragraph.

When an aqueous racemic glutamic acid solution in which α-form DL-GA is present as a dispersed amount is inoculated with β-form optically active glutamic acid, e.g., β-form L-GA is the seed crystal, the L-isomer in the solution is crystallized out, the seed crystal growing as the aqueous solution is in the saturated state with respect to β-form L-GA. The D-isomer is initially present in the aqueous solution as a solute in an amount the same as that of the crystallized L-isomer. However, with the crystallization of the L-isomer, only the L-isomer of α-form DL-GA as the dispersed amount is dissolved in the aqueous solution in an amount corresponding to the D-isomer. After dissolving the L-isomer of the α-form DL-GA, a crystal of α-form D-GA in an amount corresponding to the amount of the dissolved L-isomer remains). The proportion of the α-form DL-GA added first as the dispersed amount is gradually reduced and β-form L-GA and α-form D-GA become the main components of the dispersed amount in the system.

However, in the liquid phase the resolution of the L-isomer in the α-form DL-GA is lower than the rate of crystallization of the L-isomer in the liquid, hence, the concentration of D-isomer gradually increases.

The increase of the concentration of the D-isomer continues for a while after the disappearance of the α-form DL-GA (existing as the dispersed amount), but the D-isomer will rapidly reach a maximum value, and thereafter become lowered.

In addition, in the present invention, when the proportion of α-form DL-GA initially present as the dispersed amount is large, the crystallization temperature is relatively low and the pH of the aqueous solution is near the isoelectric point of glutamic acid, the α-form D-GA remains as the dispersed amount even when the concentration of the D-isomer reaches its maximum after the α-form DL-GA is dissolved off. When the proportion of the α-form DL-GA which has been added at the beginning as a dispersed amount is small, the crystallization temperature is relatively high, and the pH of the aqueous solution will be either considerably higher or considerably lower than the isoelectric point of glutamic acid, the α-form D-GA will sometimes dissolve completely before or after the point at which the concentration of the D-isomer in the liquid phase reaches its maximum value.

Thus, the concentration of the D-isomer in the liquid phase has an intimate relationship to the composition of the dispersed amount. This relationship is utilized to crystallize β-form optically active glutamic acid in effective amounts from the α-form DL-GA added as the dispersed amount.

In the above example (where β-form L-GA is used as the seed crystal), both before or after the concentration of the D-isomer in the liquid phase reaches its maximum value, the dispersed amount is a mixture of a fine prismatic or flaky β-form L-GA and a granular α-form D-GA both of which are in a state of being separated from each other by utilizing a sieving action due to the difference in their grain sizes and the difference in their specific gravity.

As stated when the amount of the α-form DL-GA used as the dispersed amount at the outset is relatively small, the crystallization temperature is relatively high, the pH of the aqueous solution is considerably higher or lower than the isoelectric point of glutamic acid. The dispersed amount will sometimes consist of only β-form L-GA at the concentration of the D-isomer which is near its maximum value. In this case, β-form L-GA can be separated by a simple filtration method.

In any of the instances described above, the depletion of α-form DL-GA (added as the dispersed amount at the outset) cannot be detected from the appearance of the reaction system. Hence, it is desirable, for the effect on the subsequent resolution procedures for each optically active glutamic acid, to terminate the crystallizing procedure after the concentration of the D-isomer reaches its maximum.

The period of time until the concentration of the D-isomer reaches its maximum value during the crystallization procedure depends upon the pH and the temperature of the system during crystallization. The period generally is shortened as the pH becomes higher or lower than the isoelectric point of glutamic acid, or as the temperature is increased. However, crystallization under unusual conditions is undesirable since the transition of α-form DL-GA to other crystal forms may occur.

The invention was explained above with reference to the crystallization of β-form L-GA, but the crystallization of β-form D-GA can be similarly practiced by the process of this invention.

The process of this invention was explained above with reference to the crystallization mechanism of β-form optically active glutamic acid. However, the present invention offers many advantages since the degree of supersaturation of the aqueous solution of α-form DL-GA glutamic acid employed as the dispersed amount is stable. Specifically, the process can be practiced at a high temperature, i.e., so that the rate of crystallization becomes very high.

The stability of α-form DL-GA is basically as follows: even when α-form DL-GA is allowed to stand for 8 hours at 40° C. as a dispersed amount, the transitions of α-form DL-GA to A-form DL-GA, B-form DL-GA and DL-GA monohydrate are less than 5%. However, when the temperature becomes greater than 60° C. or lower than 30° C., the transition rate increases to some extent, which results in reducing the stability of a super saturated racemic glutamic acid. However, the rate of transition of α-form DL-GA can be decreased by incorporating in the saturated aqueous solution of racemic glutamic acid a "transition preventing agent," examples of which are set out in the following paragraph.

As illustrative transition preventing agents, there are optically active or inactive amino acids such as ananine, lysine, arginine, aspartic acid, histidine, ornithine, norleucine, norvaline, α-aminobutyric acid, citrulline. Materials such as soybean protein, soybean peptone, gelatin, casein, wheat gluten, and the like belonging to the class polypeptides. The proportion of the transition preventing agent is generally greater than 0.01% by weight, and preferably greater than 0.1% by weight based on the aqueous solution of racemic glutamic acid when an amino acid is employed, and greater than 0.005% by weight, preferably greater than 0.05% by weight, when a polypeptide is employed.

By employing α-form DL-GA as the dispersed amount, the resolution procedure of the present invention can be carried out at high temperatures, by further incorporating the aforesaid transition preventing agent, the operable temperature range can be even further enlarged.

The process of this invention can be carried out in the total concentration range wherein α-form DL-GA can be deposited or present as a dispersed amount. The crystallization is desirably, but not necessarily, conducted in an aqueous solution having a pH of 0.5–5.0, preferably about 2, and at a temperature of 40–90° C. preferably 50–70° C. If the temperature is lower than 30° C., the efficiency of resolution is lowered, and if it is higher than 90° C., α-form DL-GA tends to be easily transferred to other crystal forms (A-form DL-GA or B-form DL-GA), which are undesirable.

In addition, the optically active glutamic acid used in the present invention as the seed crystals is β-form D-GA crystals or β-form L-GA crystals. When α-type crystals are employed, no resolution occurs at any temperature.

The present invention was explained above with respect to the case of using separately prepared β-form D-GA or β-form L-GA as the seed crystal. However, since various L-amino acids other than L-glutamic acid can selectively prevent β-form L-GA from being crystallized in a saturated aqueous solution of racemic glutamic acid in which α-form DL-GA is used as the dispersed amount, whereby only β-form D-GA is spontaneously crystallized, such an L-amino acid may be added instead of adding seed crystals. However, in the case of adding such an L-amino acid, the crystals formed by the action of the L-amino acid are only β-form D-GA, and hence in the case of using the L-amino acid and seed crystals, β-form D-GA must be used as the seed crystals.

In addition, D-amino acids other than D-glutamic acid have an action similar to the aforesaid L-amino acids but the action of these other D-amino acids is completely opposite to the action of the L-amino acids, that is, the D-amino acids have the action of selectively preventing the crystallization of β-form D-GA and crystallize only β-form L-GA. Therefore, when such a D-amino acid is used together with seed crystals, β-form L-GA must be used as the seed crystals.

As amino acids acceptable in the above process, there are the D-isomers or L-isomers of lysine, leucine, phenylalanine, aspartic acid, alanine, methionine, tyrosine, ornithine, proline, valine, tryptophane, serine, threonine, arginine, histidine, cystine, isoleucine, and hydroxyproline.

In addition, the amino acids to be employed are preferably pure, but from an economical view point, it is preferable to use a liquid of a hydrolyzed protein containing a large quantity of L-amino acids.

Furthermore, it is preferable that the proportion of L-amino acid be greater than 0.1% by weight, most preferably greater than 1% by weight with respect to the saturated aqueous solution of racemic glutamic acid. If the proportion is less than 0.1% by weight in concentration, the effect thereof is weakened.

The actions of the various amino acids shown above were tested by the following experiments: 30 g. of the crystals of α-form DL-GA having a grain size larger than 60 mesh were suspended in 200 g. of an aqueous 40% racemic glutamic acid solution (pH 1) having dissolved therein 2 g. of each of the various amino acids shown in following Table 1. After stirring the suspension for 2 hours at 70° C., the dispersed amount was recovered by filtration. The crystals thus obtained were washed with a small amount of water followed by drying. Thereafter, they were sieved into particles larger than 200 mesh and particles smaller than 200 mesh. The results showed that the former crystals were almost granular crystals (α-form L-GA), while the latter crystals were almost fine prismatic crystals (β-form D-GA). The yield of the β-form D-GA to the α-form DL-GA used was determined assuming that the prismatic crystals were obtained from the conglomerate α-form DL-GA. The optical purity of the prismatic crystals was also determined, the results of this analysis also being shown in Table 1.

TABLE 1

| L-amino acid | Yield of prismatic crystals (percent) | Optical purity of prismatic crystals (β-form D-GA) (percent) | L-amino acid | Yield of prismatic crystals (percent) | Optical purity of prismatic crystals (β-form D-GA (percent) |
| --- | --- | --- | --- | --- | --- |
| None | 50 | 0 | L-proline | 37 | 64 |
| L-glutamic acid | 45 | 2 | L-valine | 34 | 60 |
| L-lysine | 20 | 76 | L-tryptophane | 56 | 66 |
| L-leucine | 50 | 87 | L-serine | 44 | 67 |
| L-phenylalanine | 22 | 76 | L-threonine | 29 | 76 |
| L-aspartic acid | 20 | 77 | L-arginine | 57 | 73 |
| L-alanine | 27 | 75 | L-histidine | 40 | 75 |
| L-methionine | 62 | 61 | L-cystine | 46 | 70 |
| L-tyrosine | 59 | 81 | L-isoleucine | 60 | 69 |
| L-ornithine | 58 | 85 | L-oxyproline | 26 | 64 |
|  |  |  | D-leucine | 50 | 87 |

NOTE.—The prismatic crystals were β-form L-GA only when D-leucine was employed.

As shown in the above table, the L-amino acids and D-amino acids, except L-glutamic acid, have the ability of crystallizing the crystals of β-form glutamic acid from α-form DL-GA with high selectivity. No such ability was observed in other optically inactive amino acids and polypeptides (e.g., gelatin, casein, soybean protein, etc.).

Figure 3:
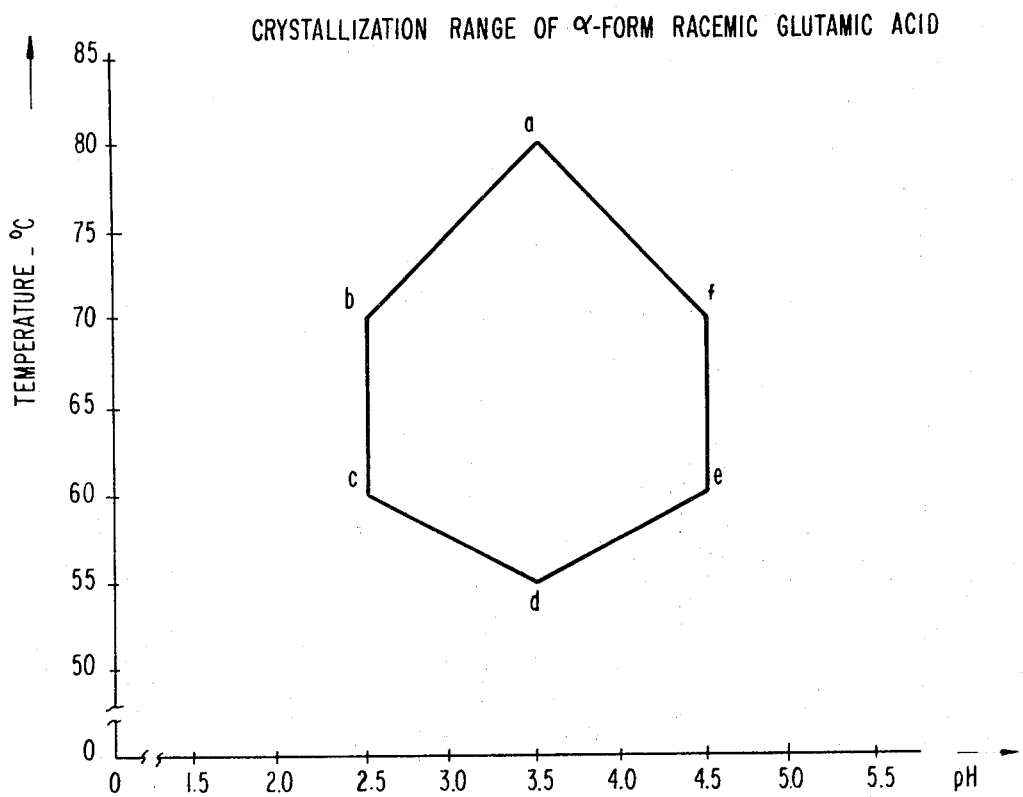
FIG. 3 illustrates the crystallization range of β-form racemic glutamic acid.
Figure 4:
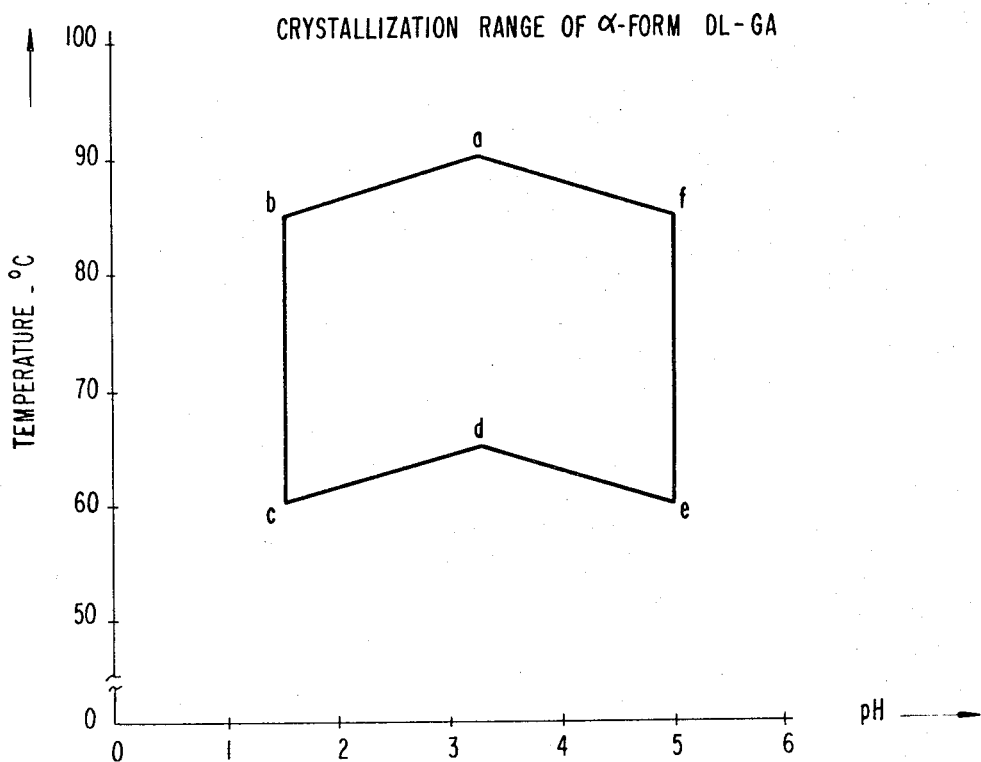
FIG. 4 is a plot illustrating the crystallization range of α-form DL-GA.

Now the crystallization process for α-form DL-GA of this invention will be further explained below. Specifically, the crystallization is carried out by maintaining an aqueous solution of racemic glutamic acid within the range formed by connecting the points:

(a) (pH 3.5 and 80° C.),
(b) (pH 2.5 and 70° C.),
(c) (pH 2.5 and 60° C.),
(d) (pH 3.5 and 55° C.),
(e) (pH 4.5 and 60° C.), and
(f) (pH 4.5 and 70° C.).

as shown in FIG. 3 of the accompanying drawing. Or the crystallization is carried out by maintaining an aqeous solution of racemic glutamic acid containing DL-GA monohydrate in a range formed by connecting the points:

(a) (pH 3.2 and 90° C.),
(b) (pH 1.5 and 85° C.),
(c) (pH 1.5 and 60° C.),
(d) (pH 3.2 and 65° C.),
(e) (pH 5.0 and 60° C.), and
(f) (pH 5.0 and 85° C.).

as shown in FIG. 4 of the drawings.

The aforesaid crystallization of α-form DL-GA may be carried out by the usual cooling methods, neutralizing methods, a combination of both these methods, or by a method of crystallization wherein a non-soduim salt of racemic glutamic acid and an acid or a hydrochloride of racemic glutamic acid and an alkali hydroxide are added to an aqueous solution of racemic glutamic acid.

However, in the crystallization process wherein the crystallization is conducted in the presence of DL-GA monohydrate, the proper supersaturation is uniformly maintained by the presence of the dissolved monohydrate. Accoringly, the process of cooling neutralization, etc. as in other methods is unnecessary, which reduces the process cost. In addition, the crystallization process is not accompanied with the by-production of salts. The formation of scale on the inside walls of apparatus is less than other crystallization methods, and large single crystals can be easily obtained.

Furthermore, it is preferable, when conducting the crystallization of α-form DL-GA, to add a small amount of α-form DL-GA as the seed crystals, whereby α-form DL-GA is selectively crystallized and crystals of α-form DL-GA having a high purity can be obtained.

Also, since α-form DL-GA tends to be more easily transferred into A-form DL-GA and B-form DL-GA at higher temperatures or as the pH of the aqueous solution shifts from the isoelectric point of glutamic acid to the acid or the alkaline side, by adding the aforesaid optically active or inactive amino acids or polypeptides as a transition preventing agent for α-form DL-GA to the aqueous solution of racemic glutamic acid (in an amount greater than 0.01% by weight, preferably greater than 0.1% by weight to the aqueous solution of racemic glutamic acid when the amino acid is employed; and an amount of greater than 0.005% by weight, preferably greater than 0.05% by weight when the polypeptide is employed) at the crystallization of α-form DL-GA, the transition of the α-form DL-GA crystallized can be suppressed.

The actions of the amino acids described above will be explained by the following experiments: 20 g. of granular α-form DL-GA was suspended in 100 ml. of an aqueous solution containing one g. of each of the additives shown in Table 2. After stirring for 3 hours at 70° C., the mitxure was filtered to provide crystals, The crystals thus obtained were washed with a small amount of water, dried and then sieved into particles having a grain size large than 200 mesh and particles having a grain size smaller than 200 mesh. The former were basically granular crystals (α-form DL-GA), while the latter were basically A-form DL-GA and B-form DL-GA.

By the above experiments, it was confirmed that when using no additives, greater than 50% by weight of the α-form DL-GA suspended in the solution was transferred after stirring for two hours, and the α-form DL-GA was completely transferred after stirring for 2.5 hours. In the case of using the additive, the proportion of material transferred was less than one-half of the dispersed amount even after stirring for three hours, as shown in the following table.

TABLE 2

| Addition | α-form content (percent) | Addition | α-form content (percent) |
| --- | --- | --- | --- |
| None | 0 | DL-norleucine | 71 |
| DL-alanine | 90 | DL-norvaline | 83 |
| DL-lysine | 63 | DL-α-aminobutyric acid | 75 |
| DL-arginine | 64 | Gelatin | 92 |
| DL-ornithine | 63 | Casein | 90 |
| DL-citrulline | 74 | Wheat glutene | 94 |
| DL-hystidine | 66 | Soybean peptone | 95 |
| DL-aspartic acid | 57 | Soybean protein | 95 |

The form of crystals thus sieved were determined by infrared absorption spectra.

As described above in detail, the present invention relates to a process of obtaining a crystal mixture of α-form and β-form optically active crystals, each having different crystal forms from α-form DL-GA, in other words a mixture of α-form and β-form crystals which can easily be separated from each other by a simple sieving process or in a liquid cyclone or the like. By the process of this invention, the crystals of enantimorphs can be simultaneously obtained by a process which is different from conventional optical resolution methods utilizing inoculation.

Moreover, the β-form optically active material obtained by the process of this invention can be separated as the crystals having a purity of greater than 99%, and when the β-form optically active material thus crystallized is β-form L-GA, the product can be used as glutamic acid in condiments for foods.

The preferred embodiments of the present invention will now be illustrated by the following examples, but the invention is not to be limited thereby.

The α-form DL-GA used in Examples 1–5 was prepared by charging, into a glass-lined crystallizer equipped with a stirrer, 11.0 kg. of DL-GA monohydrate and 89.0 kg. of water. There was then added (simultaneously) 890.0 kg. of an aqueous solution of sodium racemic glutamate having a concentration of 35.2% and 340.0 kg. of an aqueous 49% sulfuric acid solution. The temperature and the pH of the solution were maintained at 70° C. and 3.5, respectively, for seven hours to form the crystals. The α-form DL-GA used in Examples 6–10 was prepared by adding 5.0 kg. of DL-GA monohydrate and 0.8 kg. of α-form DL-GA, 60–100 mesh, as seed crystals to 20.0 kg. of an aqueous solution of racemic glutamic acid having a concentration of 15%. The system was stirred for 30 minutes at a temperature of 65° C. and a pH of 2.0 to form the crystals.

The infrared absorption spectra of the crystals obtained above coincided with that of the α-form DL-GA shown in FIG. 1 of the accompanying drawings.

The mesh size utilized in this specification is by a Tyler standard sieve, and the forms of the crystals were all confirmed by infrared absorption spectra and X-ray diffraction patterns.

EXAMPLE 1

Into a glass crystallizer (in five separate runs) having a heating jacket and a stirrer there was charged 300 g. of an almost saturated aqueous solution of racemic glutamic acid having a temperature of 40, 50, 60, 70 or 80° C., respectively. After adding 20% by weight (based on the racemic glutamic acid dissolved in the solution) of α-form DL-GA and 10% by weight of β-form L-GA, the mixture was slowly stirred. Thereafter, the optical rotation of the aqueous solution was measured every 30 or 60 minutes to determine the concentration of the D-isomer dissolved, the results of which are shown in FIG. 5 of the accompanying drawings. When the concentration of the D-isomer reached its maximum value, the dispersed amount was recovered and the type and the shape of the dispersed amount were determined, the results of which are shown in Table 3.

TABLE 3

| Temperature (° C.) | pH | Conc. of racemic glutamic acid (wt. percent) in feed solution | Time until the conc. of d-isomer dissolved reaches the maximum and the dispersed amount at that time (hr.) | Shape of dispersed amount |
| --- | --- | --- | --- | --- |
| 80 | 5 | 35 | 1.0 | Prismatic β-form L-GA. |
| 70 | 5 | 30 | 1.5 | Do. |
| 60 | 5 | 25 | 3.0 | Do. |
| 50 | 5 | 20 | 7.0 | Mixture of prismatic β-form L-GA and granular α-form D-GA. |
| 40 | 5 | 15 | 7.0 | Do. |

EXAMPLE 2

Into the crystallizer utilized in Example 1 there was charged (in four separate runs 300 g. of an almost saturated aqueous solution of racemic glutamic acid having a pH of 1.0, 3.0, 5.0, or 5.5, respectively, at a temperature of 50° C. After adding 30% by weight (based on the racemic glutamic acid dissolved of the α-form DL-GA) and 10% by weight of β-form L-GA, the mixture was slowly stirred. The concentration of the D-isomer dissolved was measured as in Example 1, and the results shown in FIG. 6 were obtained. When the concentration of the D-isomer dissolved reached its maximum value, the dispersed amount was recovered and the type and shape of the dispersed amount were determined, the results of which are shown in the following table.

TABLE 4

| Temperature (° C.) | pH | Conc. of racemic glutamic acid (wt. percent) in feed solution | Time until the conc. of d-isomer dissolved reaches the maximum and the dispersed amount at that time (hr.) | Shape of dispersed amount |
| --- | --- | --- | --- | --- |
| 50 | 1.0 | 30 | 3.0 | Prismatic β-form L-GA. |
| 50 | 3.0 | 6 | 7.0 | Do. |
| 50 | 5.0 | 20 | 7.0 | Mixture of prismatic β-form L-GA and granular α-form D-GA. |
| 50 | 5.5 | 25 | 3.5 | Prismatic β-form L-GA. |

EXAMPLE 3

In the crystallizer used in Example 1, 92 g. of monosodium racemic glutamate dihydrate was dissolved in 171 g. of water and the solution prepared maintained at 50° C. Then, 21 g. of α-form DL-GA and 7 g. of β-form L-GA were added to the aqueous solution and the resultant solution, having a pH of 5.5, was stirred. When the concentration of the D-isomer dissolved reached its maximum value (after 3.5 hours), the dispersed amount was immediately recovered by filtration, washed with a small amount of water and dried. The crystals (20 g.) thus obtained were β-form L-GA and the optical purity thereof was 95%.

EXAMPLE 4

Into two crystallizers of the type used in Example 1, there were charged 200 g. of an aqueous solution containing 30% racemic glutamic acid, 1% DL-alanine and 6% NaOH. The charges were maintained at 70° C. Then, 30 g. of α-form DL-GA sieved into a 32–60 mesh size and 6 g. of prismatic β-form L-GA sieved into a 150–200 mesh size were added to each crystallizer, and the mixture stirred at 70° C. After stirring one for one hour and the other for two hours, each of the dispersed amounts was filtered, washed with a small amount of water, dried and sieved into the particle size ranges shown in the following table. The results of this run are also shown in the same table.

TABLE 5

| | Grain size of 32–80 mesh | | Grain size of 80–150 mesh | | Grain size of 150–300 mesh | |
| --- | --- | --- | --- | --- | --- | --- |
| Dispersed amounts time of stirring (hr.) | Yield (g.) | Optical purity of prismatic crystals (α-form D-GA) (wt. percent) | Yield (g.) | Optical purity of prismatic crystals (β-form L-GA) (wt. percent) | Yield (g.) | Optical purity of prismatic crystals (β-form L-GA) (wt. percent) |
| 1 | 13.4 | 23.9 | 3.3 | 11.0 | 17.5 | 57.1 |
| 2 | 11.1 | 99.0 | 3.7 | 30.0 | 16.5 | 99.0 |

Among the dispersed amount obtained after stirring for two hours, crystals having a grain size of 32–80 mesh were granular α-form D–GA; crystals having a grain size of 150–300 mesh were prismatic β-form L–GA; and those of 80–150 mesh grain size were a mixture of the crystals of α-form D–GA and β-form L–GA.

EXAMPLE 5

Into the crystallizer of Example 1 there were charged 200 g. of an almost saturated aqueous solution (pH 1) of DL-glutamic acid at a temperature shown in Table 6 and 2 g. of L-leucine. Five separate runs were performed. After adding 30 g. of α-form DL–GA having a grain size larger than 60 mesh to the system, the mixture was stirred for a definite period of time (shown for each run in the table below). Thereafter, the dispersed amount was filtered, washed with a small amount of water, dried, and sieved into granular crystals (α-form L–GA) having a grain size larger than 200 mesh and prismatic crystals (β-form D–GA) having a grain size smaller than 200 mesh. The yield (percent) for the prismatic crystals with respect to the α-form DL–GA used and the optical purity of the prismatic crystals were measured. The measurement of the yield (percent) of prismatic crystals in the runs is given in Table 6.

TABLE 6

| Temperature (° C.) | pH | Conc. of racemic glutamic acid (wt. percent) in feed solution | Time of stirring (hr.) | Yield of prismatic crystals (β-form D–GA) (percent) | Optical purity of prismatic crystals (β-form D–GA) (percent) |
| --- | --- | --- | --- | --- | --- |
| 40 | 1.0 | 25.0 | 8.0 | 20 | 48 |
| 50 | 1.0 | 30.0 | 5.0 | 48 | 69 |
| 60 | 1.0 | 35.0 | 3.0 | 57 | 83 |
| 70 | 1.0 | 40.0 | 2.0 | 49 | 74 |
| 80 | 1.0 | 50.0 | 2.0 | 52 | 76 |

EXAMPLE 6

Into the crystallizer used in Example 1, there were charged, in separate runs as shown in Table 7, 200 g. of an aqueous racemic glutamic acid having the pH shown in Table 7 and 2 g. of L-leucine. The mixture was maintained at 60° C. Thereafter, 30 g. of α-form DL–GA having a grain size larger than 60 mesh was added and the mixture was stirred for a definite period of time (shown in Table 7). Then, the dispersed amount was filtered and processed as in Example 5; the results being shown in the following table.

TABLE 7

| Temperature (° C.) | pH | Conc. of racemic glutamic acid (wt. percent) in feed solution | Time of stirring (hr.) | Yield of prismatic crystals (β-form D–GA) (percent) | Optical purity of prismatic crystals (β-form D–GA) (percent) |
| --- | --- | --- | --- | --- | --- |
| 60 | 1.0 | 35.0 | 2.0 | 39 | 82 |
| 60 | 2.0 | 20.0 | 3.0 | 60 | 72 |
| 60 | 3.0 | 10.0 | 3.0 | 50 | 21 |
| 60 | 5.0 | 30.0 | 5.0 | 45 | 43 |

EXAMPLE 7

Into five crystallizers of the type used in Example 1, there were charged 200 g. of an aqueous solution (pH 1) of racemic glutamic acid having a concentration of 35%. Each crystallizer was maintained at 60° C. Then, after adding 60 g. of α-form DL–GA having a grain size larger than 60 mesh to each of the crystallizers and stirring the system for a definite period of time, a portion of the dispersed amount was recovered by filtration, washed with a small proportion of water, dried, and then sieved, the results being shown in the following table.

TABLE 8

| Time of stirring (min.) | Grain size larger than 200 mesh, yield (g.) | Optical purity of (α-form L–GA) (wt. percent) | Grain size smaller than 200 mesh, yield (g.) | Optical purity of (β-form D–GA) (wt. percent) |
| --- | --- | --- | --- | --- |
| 90 | 46.2 | 9.5 | 6.0 | 76.9 |
| 120 | 31.6 | 50.6 | 20.4 | 81.5 |
| 130 | 29.6 | 61.5 | 23.0 | 82.5 |
| 150 | 25.8 | 90.0 | 28.6 | 83.6 |
| 180 | 22.6 | 97.3 | 32.4 | 82.0 |

Among the dispersed amounts obtained after stirring for 150 minutes and 180 minutes, respectively, crystals having a grain size larger than 200 mesh were confirmed to be granular α-form L–GA and the crystals having a grain size smaller than 200 mesh were crystals of prismatic β-form D–GA.

EXAMPLE 8

Into the crystallizer used in Example 1 there were charged 200 g. of an aqueous solution (pH 1) of racemic glutamic acid having a concentration of 40% and a definite amount of L-leucine (shown in Table 9). The mixture was maintained at 70° C. After adding 30 g. of α-form DL–GA having a grain size larger than 60 mesh and stirring for a definite period of time (shown in Table 9), the dispersed amounts were filtered and processed as in Example 5, the results being shown in the following table.

TABLE 9

| Temperature (° C.) | pH | Conc. of L-leucine (wt. percent) in feed solution | Time of stirring (hr.) | Yield of prismatic crystals (β-form D–GA) (percent) | Optical purity of prismatic crystals (β-form D–GA) (percent) |
| --- | --- | --- | --- | --- | --- |
| 70 | 1.0 | 0 | 1.5 | 50 | 0 |
| 70 | 1.0 | 0.1 | 2.0 | 55 | 40 |
| 70 | 1.0 | 0.5 | 2.0 | 59 | 66 |
| 70 | 1.0 | 1.0 | 2.0 | 49 | 74 |
| 70 | 1.0 | 2.0 | 2.0 | 56 | 74 |

EXAMPLE 9

Into each of three crystallizers of the type used in Example 1, there were charged 222 g. of an aqueous racemic glutamic acid solution (pH 2.0) having a concentration of 26.2% and 2.2 g. of L-leucine. The systems were maintained at 70° C. Then, 44.8 g. of α-form DL–GA having a grain size larger than 60 mesh was added to each of the crystallizers. Further, to two of the three crystallizers, there was further added 2.3 g. and 9.0 g. of prismatic β-form D–GA, respectively. Thereafter, while stirring each system at 70° C., a portion of the dispersed amounts were recovered from each of the crystallizers every hour. After drying, the dispersed amount recovered was sieved into crystals having a grain size larger than 150 mesh and the crystals having a grain size smaller than 150 mesh. The optical purity thereof was measured, the results being shown in FIG. 7.

Among the dispersed amounts obtained after stirring for three hours, crystals having a grain size larger than 150 mesh were confirmed to be granular α-form L–GA, while crystals having a grain size smaller than 150 mesh were prismatic β-form D–GA.

The amount (percent) of seed crystals shown in FIG. 7 represents the amount of the β-form D–GA added with respect to the amount of the dispersed amount, α-form DL–GA.

EXAMPLE 10

Into one of two crystallizers of the type used in Example 1 there were charged 270 g. of an aqueous racemic glutamic acid solution (pH 0.8) having a concentration of 37% and 2.7 g. of L-leucine. Into the second crystallizer, there was charged only 270 g. of an aqueous racemic glutamic acid having a concentration of 37%. The systems were maintained at 60° C. Then, 45 g. of α-form DL–GA having a grain size larger than 48 mesh and 4.5 g. of prismatic β-form D–GA having a grain size smaller than 200 mesh were added to each crystallizer and the mixtures were stirred. A part of the dispersed amount was withdrawn from each of the crystallizers every 30 minutes and, after being dried, sieved into crystals having a grain size larger than 150 mesh and crystals having a grain size smaller than 150 mesh. Thereafter, the optical purity of each type of crystal was measured, the results being shown in FIG. 8. By measuring the form of crystals of dispersed amounts obtained by stirring for three hours, tit was confirmed that the crystals having a grain size larger than 150 mesh were granular α-form L–GA and those having a grain size smaller than 150 mesh were prismatic β-form D–GA when L-leucine was added.

On the other hand, when L-leucine was not added, the crystals having a grain size larger than 150 mesh were granular α-form L–GA and the crystals having a grain size smaller than 150 mesh were a mixture of the crystals of prismatic β-form D–GA and prismatic β-form L–GA.

The term "—150 mesh" in FIGS. 7 and 8 means the crystals have a grain size smaller than 150 mesh, and the term "+150 mesh" means the crystals have a grain size larger than 150 mesh.

While the above has been described in conection with the preferred embodiments of tis invention, it will be obvious to those skilled in the art that various changes and modifications may be made therein without departing from the invention, and it is aimed, therefore, to cover in the appended claims all such changes and modifications as fall within the true spirit and scope of this invention.

What is claimed is:

1. A process for crystallizing optically active glutamic acid which comprises contacting β-form optically active glutamic acid as seed crystals and a saturated aqueous solution of racemic glutamic acid comprising a racemic mixture of α-form D-glutamic acid and α-form L-glutamic acid as the dispersed amount and crystallizing from the aqueous solutions β-form optically active glutamic acid having the same optical activity as that of the seed crystals, wherein, depending on whether said seed crystals are β-form L- or D-glutamic acid, the corresponding β-form optically active L- or D-glutamic acid is produced.

2. The process as claimed in claim 1 wherein the crystallization of said β-form optically active glutamic acid is carried out in the presence of an amino acid selected from the group consisting of alanine, lysine, arginine, aspartic acid, histidine, citrulline, ornithin,e norleucine, norvaline and α-amino butyric acid, or a polypeptide selected from the group consisting of soybean protein, soybean peptone, gelatin, casein, and wheat glutene.

3. The process as claimed in claim 1 wherein said β-form optically active glutamic acid seed crystals are β-form D-glutamic acid.

4. The process as claimed in claim 1 wherein said β-form optically active glutamic acids seed crystals are β-form L-glutamic acid.

5. The process as claimed in claim 1 wherein said seed crystals are β-form D-glutamic acid crystallized by adding a L-amino acid other than L-glutamic acid to the aqueous solution of racemic glutamic acid containing α-form racemic DL-glutamic acid as the dispersed amount.

6. The process as claimed in claim 1 wherein said seed crystals are β-form L-glutamic acid crystallized by adding a D-amino acid other than D-glutamic acid to the aqueous solution of racemic glutamic acid containing α-form racemic DL-glutamic acid as the dispersed amount.

7. The process as claimed in claim 1 wherein said α-form racemic glutamic DL-glutamic acid is one which has been crystallized by maintaining an aqueous solution of racemic glutamic acid in the pH-temperature range bounded by the points a though f inclusive in FIG. 3 of the attached drawings.

8. The process as claimed in claim 1 wherein said α-form racemic DL-glutamic acid is one which has been crystallized by maintaining an aqueous solution of racemic glutamic acid containing racemic DL-glutamic acid monohydrate as the dispersed material therein in the pH-temperature range bounded by points a through f inclusive in FIG. 4 of the attached drawings.

9. The process as claimed in claim 2 wherein said amino acid is present in an amount of greater than 0.01% by weight, based on the weight of said saturated aqueous solution.

10. The process as claimed in claim 9 wherein said amino acid is present in an amount of greater than 0.1% by weight, based on the weight of said saturated aqueous solution.

11. The process as claimed in claim 2 wherein said polypeptide is present in an amount of greater than 0.005% by weight, based on the weight of said saturated aqueous solution.

12. The process as claimed in claim 11 wherein said polypeptide is present in an amount of greater than 0.05% by weight, based on the weight of said saturated aqueous solution.

13. The process as claimed in claim 1 wherein said saturated aqueous solution has a pH of from 0.5 to 5.0.

14. The process as claimed in claim 2 wherein said crystallization is carried out at a temperature of from 40 to 90° C.

15. The process as claimed in claim 14 wherein the temperature varies from 50 to 70° C.

16. The process as claimed in claim 1 wherein said seed crystals are β-form D-glutamic acid and wherein said seed crystals are used together with at least 0.1% by weight, based on the weight of said saturated aqueous solution, of the L-isomer of an amino acid selected from the group consisting of lysine, leucine, phenylalanine, aspartic acid, alanine, methionine, tyrosine, ornithine, proline, valine, tryptophane, serine, threonine, arginine, histidine, cystine, isoleucine, and hydroxyproline.

17. The process as claimed in claim 1 wherein said seed crystals are β-form L-glutamic acid and wherein said seed crystals are used together with the D-isomer of an amino acid selected from the group consisting of lysine, leucine, phenylalanine, aspartic acid, alanine, methionine, tyrosine, ornithine, proline, valine, tryptophane, serine, threonine, arginine, cystine, isoleucine, and hydroxyproline.

18. The process as claimed in claim 5 wherein said L-amino acid is the L-isomer of an amino acid selected from the group consisting of lysine, leucine, phenylalanine, aspartic acid, alanine, methionine, tyrosine, ornithine, proline, valine, tryptophane, serine, threonine, arginine, histidine, cystine, isoleucine, and hydroxyproline.

19. The process as claimed in claim 6 wherein said D-amino acid is the D-isomer of an amino acid selected from the group consisting of lysine, leucine, phenylalanine, aspartic acid, alanine, methionine, tyrosine, ornithine, proline, valine, tryptophane, serine, threonine, arginine, histidine, cystine, isoleucine, and hydroxyproline.

20. The process as claimed in claim 7 wherein a small amount of α-form DL-glutamic acid is present as seed crystals.

21. The process as claimed in claim 8 wherein a small amount of α-form DL-glutamic acid is present as seed crystals.

22. The process as claimed in claim 7 further comprising adding at least 0.01% by weight, based on the weight of said aqueous solution of racemic glutamic acid, of an amino acid selected from the group consisting of alanine, lysine, arginine, aspartic acid, histidine, citrulline, ornithine, norleucine, norvaline and α-amino butyric acid, or at least 0.005% by weight, based on the weight of said aqueous solution of racemic glutamic acid containing racemic DL-glutamic acid monohydrate, of a polypeptide selected from the group consisting of soybean protein, soybean peptone, gelatin, casein and wheat glutene.

23. The process as claimed in claim 8 further comprising adding at least 0.01% by weight, based on the weight of said aqueous solution of racemic acid, of an amino acid selected from the group consisting of alanine, lysine, arginine, aspartic acid, histidine, citrulline, ornithine, norleucine, norvaline and α-amino butyric acid, or at least 0.005% by weight, based on the weight of said aqueous solution of racemic glutamic acid containing racemic DL-glutamic acid monohydrate, of a polypeptide selected from the group consisting of soybean protein, soybean peptone, gelatin, casein, and wheat glutene.

References Cited

UNITED STATES PATENTS

| | | | |
|---|---|---|---|
| 3,414,611 | 12/1968 | Noyori et al. | 260—534 G |
| 3,381,033 | 4/1968 | Grier et al. | 260—534 G |
| 3,360,554 | 12/1967 | Yamamoto et al. | 260—534 G |
| 2,882,302 | 4/1959 | Fike | 260—534 G |
| 2,790,001 | 4/1957 | Purvis | 260—534 G |

FOREIGN PATENTS

| | | | |
|---|---|---|---|
| 701,736 | 1/1965 | Canada | 260—534 G |
| 680,233 | 2/1964 | Canada | 260—534 G |
| 1,497,851 | 9/1967 | France | 260—534 G |

LORRAINE A. WEINBERGER, Primary Examiner

J. L. DAVISON, Assistant Examiner